United States Patent [19]
Gehrig et al.
[11] Patent Number: 4,790,511
[45] Date of Patent: Dec. 13, 1988

[54] HYDRAULIC APPARATUS, IN PARTICULAR A 2-WAY PROPORTIONAL THROTTLE VALVE

[75] Inventors: Norbert Gehrig, Zellingen-Duttenbrunn; Hans Wölfges, Lohr, both of Fed. Rep. of Germany

[73] Assignee: Mannesmann Rexroth GmbH, Lohr, Fed. Rep. of Germany

[21] Appl. No.: 906,452

[22] Filed: Sep. 12, 1986

[30] Foreign Application Priority Data

Sep. 12, 1985 [DE] Fed. Rep. of Germany ....... 3532591

[51] Int. Cl.[4] .............................................. F16K 31/40
[52] U.S. Cl. .................................... 251/30.02; 251/26
[58] Field of Search ............ 137/487.5; 251/26, 30.01, 251/30.02, 44

[56] References Cited

U.S. PATENT DOCUMENTS

| | | | |
|---|---|---|---|
| 2,373,654 | 4/1945 | Beekley et al. | 251/30.02 X |
| 2,755,058 | 7/1956 | Margrave | 251/30.02 X |
| 4,073,464 | 2/1978 | Hansen et al. | 251/26 |
| 4,463,929 | 8/1984 | Dantlgraber et al. | 251/44 |
| 4,478,245 | 10/1984 | Bender | 137/487.5 X |
| 4,535,966 | 8/1985 | Post et al. | 251/26 X |

FOREIGN PATENT DOCUMENTS

| | | | |
|---|---|---|---|
| 1247794 | 8/1957 | Fed. Rep. of Germany | 251/26 |

*Primary Examiner*—John Rivell
*Attorney, Agent, or Firm*—Cushman Darby & Cushman

[57] ABSTRACT

A pilot-controlled proportional throttle valve is provided having pilot oil passage means provided in the spool of said throttle valve.

7 Claims, 2 Drawing Sheets

HYDRAULIC APPARATUS, IN PARTICULAR A 2-WAY PROPORTIONAL THROTTLE VALVE

The invention relates generally to a hydraulic apparatus for generating a control pressure for a position-controlled hydraulically actuated adjusting member. A control spool is adjustable depending on the difference between the desired value and the actual value of a position control circuit. The control spool of a control valve is adapted to connect the one hydraulically supplied control chamber of the control member with the tank or with a pressure source. The invention relates in particular to a pilot controlled throttle valve in which the control or pilot pressure medium, preferably oil is supplied in an improved manner.

2-way proportional throttle valves are already known. Such valves use generally a main valve and a pilot control valve. Generally, a proportional solenoid is associated with the pilot control valve and a position indicator is connected with the main valve. In the prospectus RW No. 29 203/4.83 of Mannesmann Rexroth GmbH, Lohr/Main, West Germany, a pilot controlled 2-way proportional throttle valve is already described. This known throttle valve shows for certain operating conditions instabilities. This known valve will be discussed below and it will be noted that it uses for all operating conditions the so-called double edge or double land control. The double edge control generally has the advantage that high requirements with respect to dynamics can be fulfilled.

It is an object of the present invention to provide a 2-way proportional throttle valve of the kind set forth in the preamble of claim 1 such that instabilities during operation of the valve are avoided. It is another object of the present invention to provide a 2-way proportional throttle valve comprising a pilot valve and a main valve such that for high requirements regarding dynamics an automatic transfer or switch in the operation of the valve from the single edge control mode to the two edge control mode is provided.

In accordance witht he present invention the 2-way proportional throttle valve and in particular the main valve of said proportional throttle valve is designed such that in a situation where during normal operation the pilot oil feeding means are clogged, the valve operation still can be continued in the two edge control mode instead of the single edge control mode.

In the specification oil will be referred to as the pressure medium. Oil is preferred, but the valve of the invention may also be used in connection with other pressure media.

The objects of the invention thus generally stated together with other objects and ancillary advantages are attained by the construction and arrangement set forth by way of illustration and not of limitation in the accompanying drawings, in which:

FIG. 1 represents a 2-way proportional throttle valve 100 of the prior art which can be used as an orifice. The desired degree or amount of opening may be set by an electric signal representing the desired value.

Figure 1:
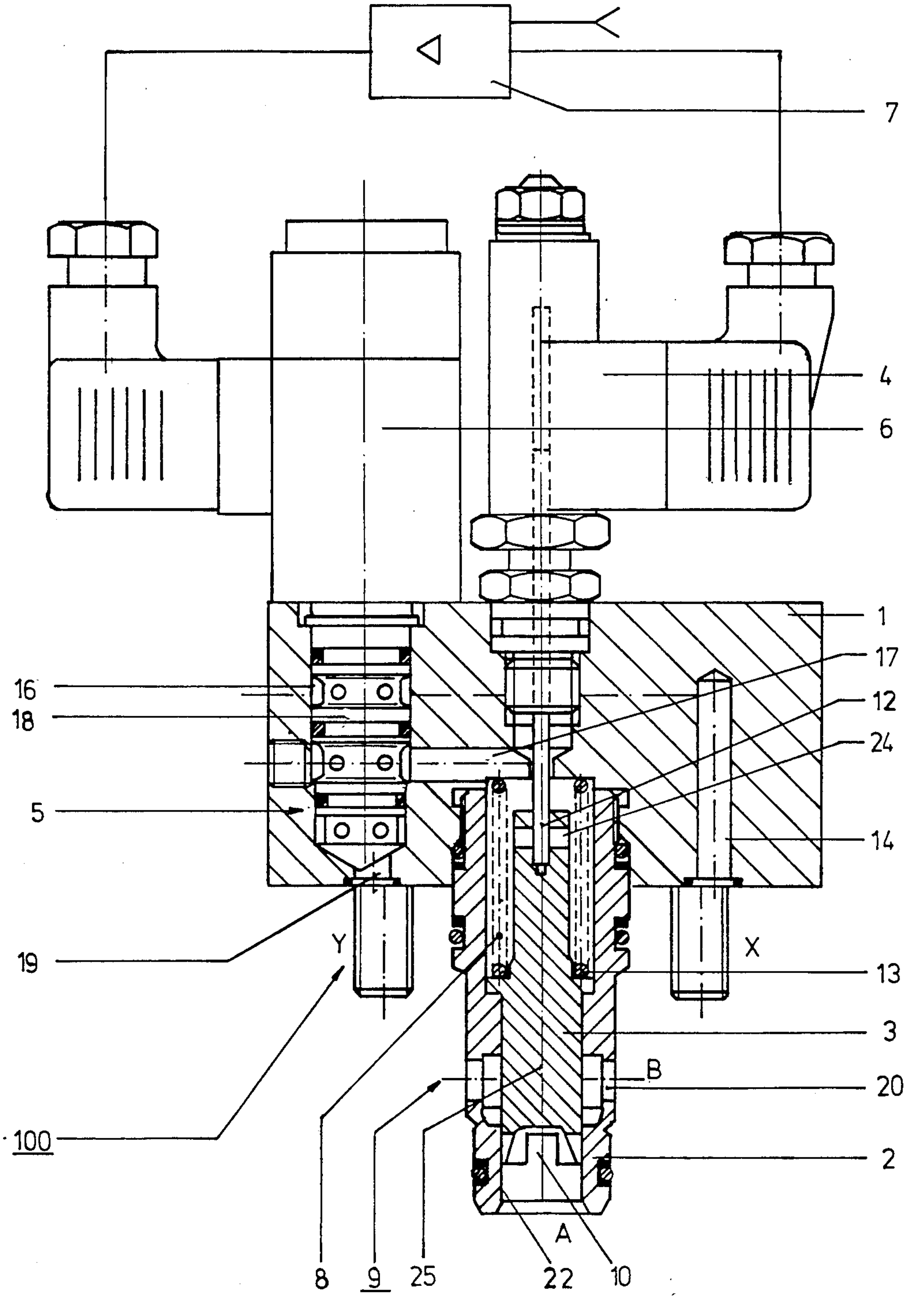
Fig. 1 (PRIOR ART)
FIG. 1 is a longitudinal section of a pilot controlled 2-way proportional throttle valve of the prior art.

The 2-way proportional throttle valve 100 comprises in substance a main valve 9, a pilot control valve 5, a position indicator 4 and a proportional solenoid 6. The main valve 9 is in the form of a single edge throttle valve.

In the embodiment shown, a cover 1 is provided into which a sleeve 2 of the main valve 9 is screwed. In said sleeve 2 a main spool 3 is reciprocally mounted and is biased into its closing position by spring means 13. In said cover 1 the position indicator 4 and the pilot control valve 5 together with the proportional solenoid 6 are mounted, preferably by screwing said components into said cover 1.

The direction of flow of the pressure medium occurs between A and B or between B and A. "A" and "B" refer to user or load ports as is customary in the field of hydraulics. Please see FIG. 1 in this context. If the flow of pressure medium occurs from A to B then it may be said that sleeve 2 is provided with a pump port 22 and user or load ports 20. Further, a pilot or control oil port X is connected with port A and is further connected with a pilot oil passage 14 in said cover 1 so as to supply said pilot valve with pilot oil. Moreover a pilot oil drain passage Y is connected with a tank port passage 19 provided in said cover 1. The pilot oil drain passage Y leads to a tank not shown, preferably under conditions of no pressure.

In an amplifier 7 a comparison is carried out between a desired main valve opening value (i.e. an external signal representative of this desired value is input into said amplifier) and the actual opening value (for this purpose the output signal of the position indicator is fed back to the amplifier 7). In accordance with the differential value between said desired value and the actual value, an electric control signal in the form of a control current will be supplied to the proportional solenoid 6. The proportional solenoid 6 and the pilot control valve 5 convert said electric control signal into a corresponding distance through which the spool 18 of the pilot control valve 5 moves.

It should be noted that the pilot control valve 5 operates in accordance with the two edge control principle. As a consequence, the pressure in a spring chamber 8 of the main valve 9 is adjusted in such a manner that the spring loaded main spool 3 moves into a position in accordance with the given desired value. Should the electric power supply fail, for instance due to a broken cable, the orifice will close automatically, thus providing a safety features.

The components of the position control circuit are adjusted with respect to each other such that the desired value and the movement of the main piston are directly proportional to each other. Consequently, for a constant pressure differential at the orifice the volume of pressure medium (the flowing volume) from A to B depends only on the movement of the spool 3 and the geometry or size of the window 10.

Going into some more detail, the pilot control valve 5 comprises a pilot control spool 18, the position of which is adjustable by means of the proportional solenoid 6. The supply of pilot oil occurs via the mentioned pilot oil passage 14 and from there via a passage (not shown) to a spool chamber 16 of the pilot control valve. The pilot control spool 18 provides for a two edge control and supplies, depending on its position, more or less pilot oil via a pilot oil passage 17 in the cover 1 to said spring chamber 8.

The end of the main or control spool 3 which is located in said spring chamber 8 is connected by means of a rod 12 with said position indicator 4. The rod 12 extends along the longitudinal axis 25 of the main spool 3.

A cross bore 24 is provided in said main spool 3 in the area of the end of the rod 12 so as to simplify the installment and the mounting of the rod 12 at the main spool 3.

Generally, the 2-way proportional throttle valve 100 shown in FIG. 1 operates perfectly. However, for certain conditions of operation of the hydraulic system connected with said 2-way proportional throttle valve 100, instabilities occur which endanger perfect operation.

Figure 2:
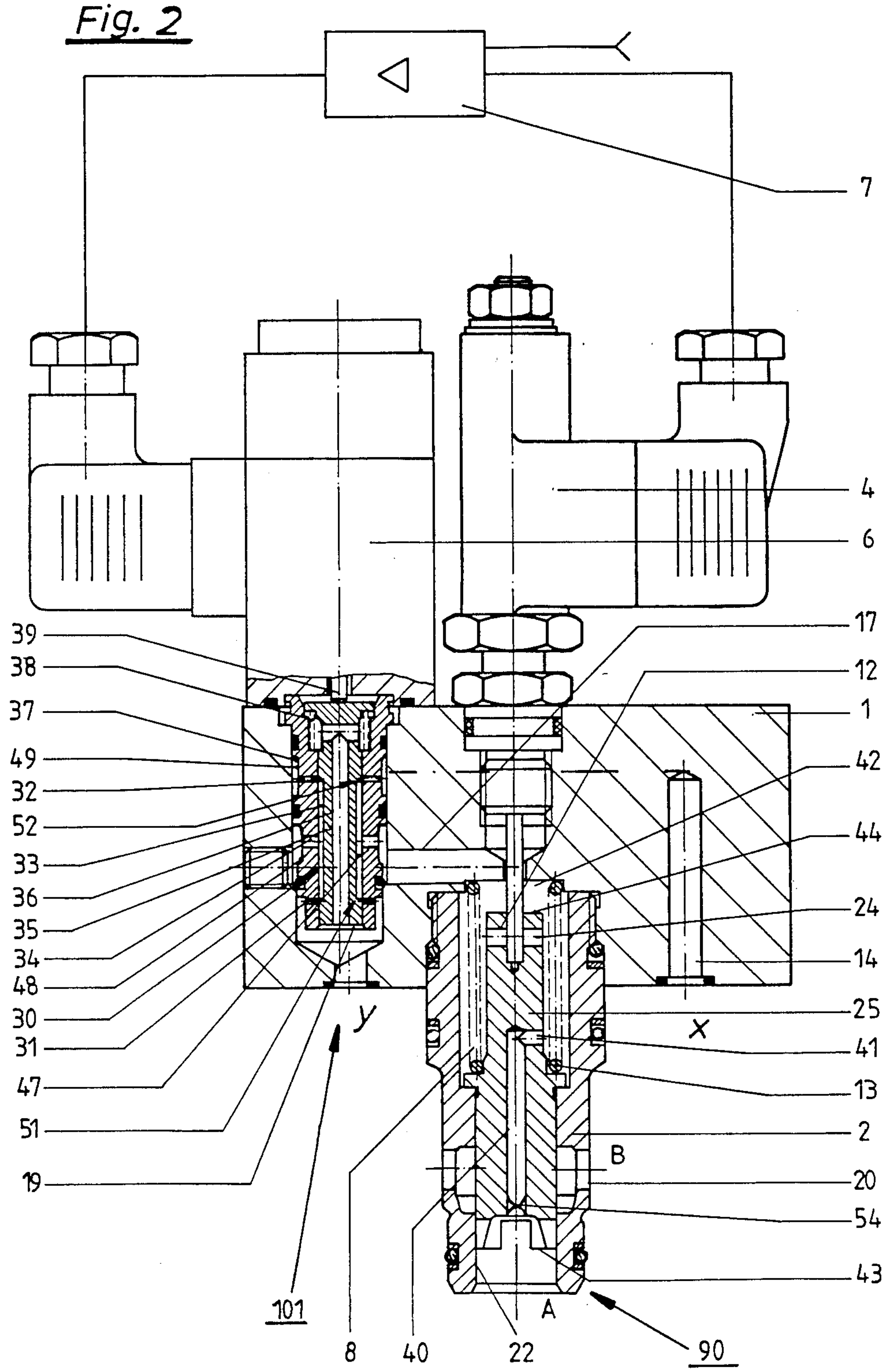
FIG. 2 is a longitudinal section of a pilot controlled 2-way proportional throttle valve of the invention.

In accordance with the invention, a 2-way proportional valve 101 shown in FIG. 2 is provided to overcome said difficulties mentioned above. The valve 101 is in some respects similar to the valve 100 of the prior art and therefore similar reference numerals are used wherever possible for the valves shown in FIGS. 1 and 2.

Similar to the valve 100, the valve 101 of the invention shown in FIG. 2 comprises a pilot control valve 30 together with a proportional solenoid 6 and a position indicator 4. All said components are mounted in cover 1. Moreover, valve 101 comprises a main valve 90 which differs from the main valve 9 of FIG. 1 in a manner yet to be described. Even though the pilot control valve 30 of FIG. 2 is similar to the pilot control valve 5 of FIG. 1, it should be noted that the supply of pilot oil is carried out for the valve 101 of the invention by means of the pilot oil passage 17. It should be further noted that the pilot control valve 101 of FIG. 2 is shown in a different representation than the valve of FIG. 1. This different representation is used because it simplifies the explanation of the invention.

It is of significant importance to note that the main valve 90 of the invention comprises pilot oil passage means which connect the "pump side" of the main spool 3 with the "spring chamber side" of said main spool 3. Moreover, the pilot control valve 30 has control edge means in the form of a single edge control. Preferably, the control edge means of the pilot control valve 30 define a single edge control during normal operation and a two edge control in emergency situations.

In the embodiment of FIG. 2, the end of the main spool 3 facing towards the pump i.e. port A, is connected to said spring chamber 8 by connecting or conduit means. Said connecting means comprise a longitudinal bore 40 in said main spool. The longitudinal bore 40 is connected with one (or a plurality) of cross bores 41 in the area of the spring chamber 8. Preferably, the longitudinal bore 40 extends along the longitudinal axis 25.

It is also possible (but not shown) to arrange said connecting means or conduit means completely or partially in the wall of the sleeve 2. Preferred, however, is the arrangement of the connecting means in the main spool 3.

It should be noted that the spring chamber 8 is in turn connected via the pilot oil passage 17 to the pilot control valve 30 so as to supply pilot oil to an annular recess 48 provided in the body of pilot valve 30. The pilot oil can flow from said annular recess 48 via cross bores 34 into an annular recess 33 in the pilot control spool 35. During normal operation, more or less pilot oil will be drained via said cross bores 31 to the tank, depending on the predetermined desired value in the form of an electrical signal which causes a certain adjustment of pilot spool 35. The amount of pilot oil drained will be controlled by a single edge control means formed by first control edges 52. During normal operation of the valve 101, the two control edges 15 remain outside of their control range and are therefore not needed. During normal operation, the entire pilot oil supply for the pilot valve flows beginning at the pump port 22 via longitudinal bore 40, cross bore 41, the spring chamber 80 and the pilot oil passage 17 to the annular reces 48.

For safety and back-up reasons the present invention maintains the pilot oil supply means of FIG. 1. I.e., also for valve 101 pilot oil is supplied to pilot oil passage 14 and can flow from there via passage means not shown to an annular recess 37. Cross bores 32 in pilot valve body or sleeve connect the recess 37 with the inner surface 48 of the sleeve of the pilot control valve 30. During normal operation, the pilot oil chamber 47 formed by the annular recess 33 is not connected to the cross bore 32 so that no pilot oil is supplied. However, if for instance, a clogging of the pilot oil supply means leading to the main spool 3 occurs, the position indicator 4 and the proportional valve 6 will automatically cause an actuation of the pilot valve 30 in such a manner that pilot oil flows via the cross bore 32 into the pilot oil chamber 47, whereupon the operation in accordance with the rules of the two edge control mode occur as is known from the valve 100 of FIG. 1.

Preferably jet, throttle or nozzle means 54 are provided in said pilot oil passage means, which connect the pump side of the main spool 3 with the spring chamber side of said main spool 3. Preferably, a nozzle means 54 is located at the end of the longitudinal bore 40 facing towards the pump. In principle, the nozzle or jet means may be provided in the main spool anywhere between the pump chamber side and the spring chamber side. For example, said throttle means could be formed by the cross bore 41, or if a plurality of cross bores is provided by said plurality of cross bores.

In the embodiment shown, a longitudinal bore 40 and cross bore 41 are provided for connecting the pump chamber side with the spring chamber side of the main spool 3. It is also possible to provide a single inclined bore in said main spool to provide for said desired connection. It is also possible to make use of the cross bore 24 which exists anyway.

To supply the pilot oil via the main spool 3 in accordance with the invention is also advantageous from a standpoint of manufacturing costs. This design makes it possible that the known supply of pilot oil via the cover 1 and via the two edge control means 52 can also be maintained without any problems.

It will be appreciated that the valves of both FIG. 1 and FIG. 2 are of the so called cartridge design. Therefore, the bodies or sleeves of the pilot valves as well as the main valves are inserted into plates having the required built-in passages.

We claim:

1. A 2-way proportional throttle valve comprising:

a throttle valve housing;

a main, 2-way valve mounted to said housing and having a main spool actuatable by means of pilot oil and having a pump side, a spring chamber side, and defining first pilot oil passage means for fluidly coupling the pump side of the main spool with the spring chamber side of said main spool;

a proportional solenoid mounted to said housing;

a pilot control valve mounted to said housing and operatively coupled to said proportional solenoid;

second pilot oil passage means for fluidly coupling said pilot control valve and said spring chamber side, said pilot valve defining first control edge means on a surface thereof for providing a single edge control for controlling the size of a vent passage to a tank during a single edge control mode in accordance with the position of said proportional solenoid independently of a flow through opening defined between said control valve and said second pilot oil passage means, whereby said first and second pilot oil passage means provide a connection between the pump side of the main spool and said first control edge means, said first pilot oil passage means including a jet means such that on contamination of said jet means or said first pilot oil passage means, an automatic transfer from the single edge control mode to a two-edge control mode occurs.

2. The valve of claim 1, wherein said first pilot oil passage means are provided in said main spool.

3. The valve of claim 1, wherein said first pilot oil passage means comprise a longitudinal bore in said main spool, said longitudinal bore being connected with its input end to a pump sort.

4. The valve of claim 3, wherein said jet means is arranged at the input side of said longitudinal bore.

5. The valve of claim 4, wherein the end of the longitudinal bore opposite to the input end is connected via cross bores in the main spool with the spring chamber side.

6. A 2-way proportional throttle valve comprising:

a main valve having a main spool arranged in a housing, and spring means adapted to bias said main spool into a closed position, said main spool defining a pump side in communication with a pump port provided in said housing and further defining, opposite to said pump side a spring chamber side adjacent to a spring chamber containing a spring for urging said main spool into a closed position, a pilot control valve adapted to allow the flow of pilot oil to said main valve in accordance with the position of a proportional solenoid, primary pilot oil passage means connecting the pump side of said main spool with the spring chamber side of the main spool, single edge control means and two-edge control means provided by a control spool of said pilot control valve, wherein said pilot oil supplied to said pilot control valve occurs via two independent passages, one passage via said two-edge control means and another passage defined by said primary passage means, such that in a single edge control mode, flow from said pilot control valve to a tank is controlled by said single edge control means in accordance with the position of said proportional solenoid and independently of pilot oil flow through said one passage.

7. The 2-way proportional throttle valve of claim 6, wherein pilot oil supply for the two edge control is carried out exclusively via a cover within which the pilot control valve as well as the main valve are arranged, while the pilot oil supply for the single edge control is provided via the spool of said main valve and further via passage means in said cover.

* * * * *